Aug. 9, 1960 N. E. HANDEL 2,948,845
MAGNET ASSEMBLY FOR NUCLEAR MAGNETIC RESONANCE APPARATUS
Filed Dec. 23, 1957 2 Sheets-Sheet 1

INVENTOR
Neil E. Handel
By Anthony D. Cennamo

Aug. 9, 1960 N. E. HANDEL 2,948,845
MAGNET ASSEMBLY FOR NUCLEAR MAGNETIC RESONANCE APPARATUS
Filed Dec. 23, 1957 2 Sheets-Sheet 2
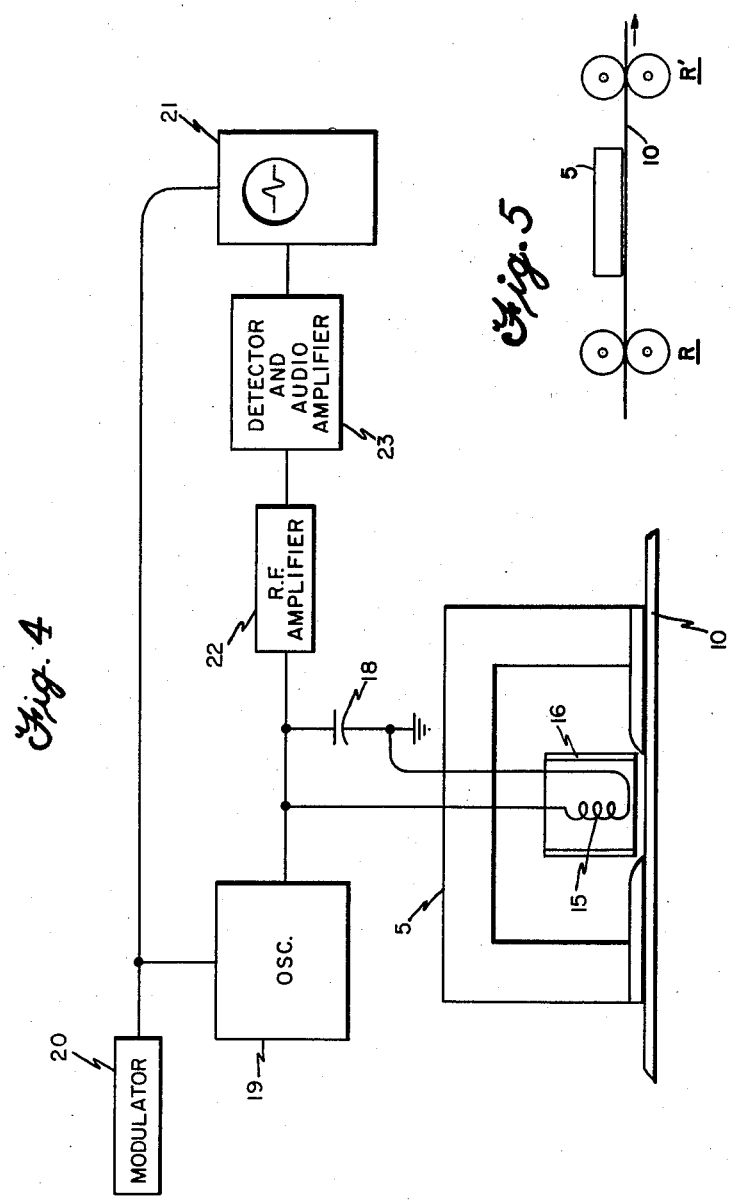
INVENTOR
Neil E. Handel
by Anthony D. Cennamo United States Patent Office 2,948,845
Patented Aug. 9, 1960

2,948,845

MAGNET ASSEMBLY FOR NUCLEAR MAGNETIC RESONANCE APPARATUS

Neil E. Handel, Columbus, Ohio, assignor to Industrial Nucleonics Corporation, a corporation of Ohio Filed Dec. 23, 1957, Ser. No. 704,625

6 Claims. (Cl. 324—.5)

This invention relates to measuring apparatus, and in particular to an improved magnet assembly for conditioning a material to be analyzed by measurement of various phenomena occurring in response to nuclear magnetic resonance.

It is well known in the prior art relating to nuclear physics that many atomic nuclei possess magnetic moment and nuclear momentum or "spin." A nucleus having these characteristics displays gyroscopic effects and is therefore often considered analogous to a spinning gyroscope having a magnet positioned along its axis.

When such nuclei are subjected to a unidirectional magnetic field, the spinning nuclei initially tend to precess around an axis parallel to the magnetic field. After a period of time, damping forces suppress the nuclear precession enabling the nuclear moments to line up with the magnetic field. In the event the polarized nuclei are subjected to a radio-frequency field at right angles to the magnetic field, nuclear precession is again initiated.

Prior investigators have studied the gyroscopic properties of nuclei by subjecting an element to a magnetic field produced by a permanent magnet and simultaneously irradiating the element with radio-frequency electromagnetic energy emanating from an oscillator tank coil. When the frequency of the radio-frequency source resonates with the frequency of nuclear precession, the spinning nuclei absorb a maximum amount of energy from the radio-frequency field thereby loading the tank circuit. The resonant frequency of nuclear precession varies for different elements and for different values of the polarizing magnetic field.

In the event that the hydrogen atom is subjected to a magnetic field strength of 3500 gauss, the resonant frequency is 14.88 megacycles per second. The angular momentum (I) in units of $$\frac{h}{2\pi}$$

where $h$ is Planck's constant, is .05, and the magnetic moment ($\mu$) in units of nuclear Bohr magnetrons is 2.7896.

Within recent years, measuring devices have been proposed which are operative in response to the energy absorption occurring at the nuclear magnetic resonant frequency. From this absorption measurement, the relative proportion of an element in question can be determined because the total energy absorbed is a function of the number of nuclei present. Apparatus of this type can be used for the quantitative determination of any element, the nucleus of which possesses angular momentum and magnetic moment, such as for example, hydrogen, helium, lithium, beryllium, boron, and nitrogen. Additionally, quantitative determination of various isotopes of elements can also be made, because in many cases the different isotopes have different resonant frequencies.

The absorption phenomenon of nuclear magnetic resonance is also used to measure constituent proportions in various compounds. For example, moisture content measurements can be made in materials, such as tobacco or paper. In such a determination the water content is not determined directly but, rather, indirectly by the amount of hydrogen present therein. By applying the same principles it is possible to measure the presence of any compound which contains at least one element the nucleus of which possesses angular momentum and magnetic moment.

In the absence of damping forces, nuclei placed in a magnetic field would not line up therewith but would continually precess on the axis of the magnetic field. As previously stated, damping forces do exist, and just as the friction of a gyroscope eventually causes it to assume a position of lowest potential energy in the gravitational field, that is line up with the field, so these damping forces eventually suppress the nuclear precession and so allow the nuclear moments to line up with the polarizing magnetic field. A quantity of importance in understanding the present invention is the time required for these damping forces to act. This time, which is called the relaxation time, may have values from $10^{-5}$ seconds or less to many minutes or more.

The following conditions must be fulfilled in measuring instruments operative in response to nuclear magnetic resonance if high accuracy is to be attained:

(1) The magnetic field must be exceedingly uniform in the area of measurement.

(2) The volume of the sample to be measured must be in the magnetic field at least the relaxation time before resonance can occur.

(3) The radio-frequency field must be at right angles to the magnetic field.

In most measuring instruments designed to continuously monitor a moving sample one or more of the foregoing conditions may be particularly difficult to satisfy. For example, in apparatus for determining the moisture content of a moving paper web in a paper machine, it is difficult to dispose the radio-frequency field at a right angle to the uniform magnetic field. Additionally, due to paper speeds of the order of 30 feet per second, it is also difficult to subject each sample to a magnetic field for the relaxation time. A uniform magnetic field is difficult to obtain under any circumstances.

Accordingly, a principal object of this invention is to provide improved apparatus for making nuclear magnetic resonance measurements on a moving material.

Another object of this invention is to provide an improved magnet assembly for subjecting moving material to a magnetic field for the relaxation time required to make nuclear magnetic resonance moisture measurements.

Another object is to provide improved apparatus for determining the moisture content of moving sheet material, such as paper, by nuclear magnetic resonance measurements.

In order to apply a uniform magnetic field to a moving paper web for the time required to overcome the relaxation time of water, the length of the magnetic field must be of the order of one foot, which at 30 feet per second represents 33 milliseconds. This field length is also adequate to take care of higher paper speeds provided the relaxation time has been adequately reduced by dissolved paramagnetic salts in the paper.

A preferred embodiment of the apparatus of this invention adapted for measurements on sheet-like material comprises a magnet assembly including a U-shaped magnet having a pair of wide legs. These legs are each capped by closely spaced pole pieces of thin magnetic material so that a narrow gap having an approximate one foot width is formed. The adjacent ends of the pole pieces are magnetically saturated, and therefore the leakage field is relatively uniform for an appreciable distance away from the gap.

In the application of this magnet assembly to the measurement of the moisture content of paper, the paper web is moved in a plane parallel to the plane containing the pole pieces and in a direction parallel to the ends of the pole pieces. A given section of the paper is, therefore, exposed to the magnetic field for a distance of about one foot and the magnetic field direction in the paper is essentially parallel to the plane of the paper web.

A radio-frequency coil is positioned between the far end of the magnet legs so as to subject a continuously changing paper sample to a radio-frequency field perpendicular to the magnet field after the relaxation time of the sample has been attained.

A constant-current frequency-modulated source energizes the coil so that the resonant frequency for moisture (hydrogen nucleus) is attained several times per second for the value of the magnetic field used. The resulting periodic loading of the coil at magnetic nuclear resonance varies in accordance with the moisture content of the sample under test. The voltage across the coil therefore assumes a periodic amplitude directly responsive to variations in the moisture content of the sample under test.

In order that all of the features for attaining the objects of this invention may be readily understood, reference is herein made to the drawings wherein:

Fig. 4 is a simplified block diagram of a readout circuit satisfactory for use with the magnet assembly structures shown in the drawings.

Fig. 5 is a schematic diagram showing the arrangement of the magnet assembly with respect to one form of web or sheet transport mechanism such as is used in conventional paper making machines and the like.

Figure 1:
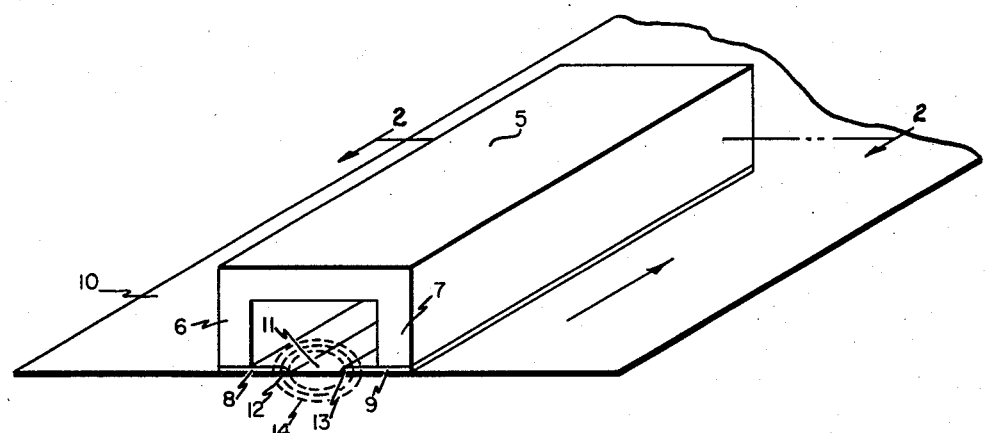
Fig. 1 is a perspective view of the magnet assembly of this invention.
Figure 2:
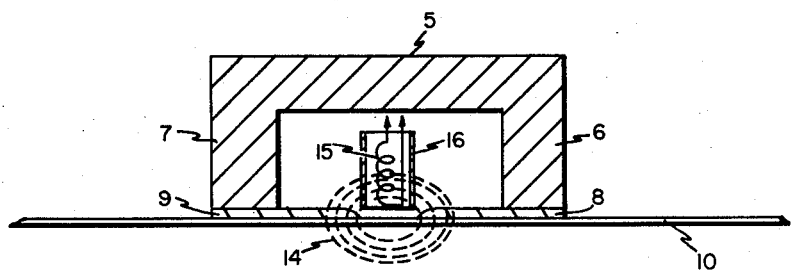
Fig. 2 is a cross-sectional view of the structure of Fig. 1 showing the positioning of the radio-frequency energizing coil relative the magnet structure.

Referring now to Figs. 1 and 2, the magnet assembly comprises a U-shaped magnet 5 which has a channel-like cross section including legs 6 and 7 which are disposed in a parallel spaced relationship. The lowermost ends of legs 6 and 7 are capped by pole pieces 8 and 9 which are fabricated from thin magnetic material. In a preferred instrument embodment adapted to make relative moisture readings, magnet 5 and its associated pole pieces 8 and 9 provide a magnetic conditioning region of at least one foot in length. That is, the narrow gap 11 between the ends of the pole pieces has a width in excess of one foot which is many times the length of the gap. This gap width is sufficient to overcome the relaxation time of the moisture contained in traveling paper web 10 providing the web moves at a speed which does not exceed approximately 30 feet per second.

Referring to Fig. 5, the magnet assembly, indicated by the numeral 5, may be installed on a conventional paper making machine or other sheet material processing apparatus where the web or sheet 10 is carried through successive sets R and R' of rolls. Either or both sets of rolls may be mechanically driven in conventional fashion, preferably so as to maintain a slight tension on the sheet 10. The magnet 5 may be suspended by any suitable means (not shown) so that the pole pieces 8 and 9 are in close proximity and located in a plane parallel to the plane of the traveling sheet 10.

In view of the fact that pole pieces 8 and 9 are relatively thin and are formed with adjacent ends 12 and 13 which are tapered, a relatively uniform leakage field 14 is established for an appreciable distance out from the pole pieces. Accordingly, if the moving web of paper 10 moves across these pole pieces in a direction parallel to the ends 12 and 13 of the pole pieces, a given section of the paper is exposed to the magnetic field for a sample movement distance in excess of one foot. The direction of the magnetic field established through the paper section spanning gap 11 is parallel to the plane of the sheet.

The actual measurement of moisture content of paper web 10 may be made in the same magnet structure that is used for relaxation time conditioning of the sample. In the alternative, the measurement can be made in an adjacent magnetic field disposed immediately beyond the exit of the conditioning magnet 5. In either case, a preferred arrangement contemplates the positioning of a radio-frequency coil between the legs of magnet 5 or the legs of an additional magnet (not shown).

A more compact assembly is attained by disposing coil 15 between the legs 6 and 7 of magnet 5. Therefore, the following detailed description is directed to this preferred construction. As is shown in Fig. 2, the longitudinal axis of coil 15 is perpendicular to the plane of paper sheet 10. Accordingly, the radio-frequency field generated by coil 15, is perpendicular to the magnetic field through gap 11 and the sample paper section spanning this gap.

A cylindrical shield 16 having only a bottom opening is positioned around coil 15. Paper web 10 is disposed immediately below the bottom opening in the shield, therefore, the shield restricts the size of the paper sample excited by the radio-frequency field of the coil. With this arrangement, the distance between the end of the coil and the excited paper sample is small compared to the diameter of the coil. The radio-frequency field is therefore essentially perpendicular to the plane of paper 10 which fulfills the necessary relationship between the two fields.

In order to avoid magnetic field discontinuities at the far end of magnet 5, the radio-frequency coil is preferably placed approximately one diameter in from this end of the magnet. In the usual case, this distance is sufficient to remove the paper sample under test from the portion of the magnetic field which lacks uniformity due to edge effects.

Figure 3:
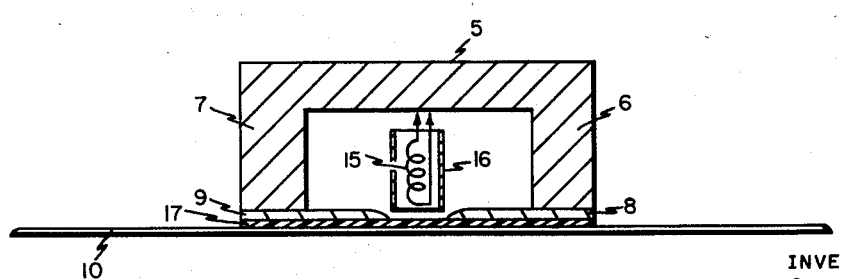
Fig. 3 shows a modification in the magnet assembly of Figs. 1 and 2.

Fig. 3 shows a modified arrangement of the magnet assembly of Figs. 1 and 2. This modification contemplates the placement of a thin plate 17 of plastic between paper web 10 and pole pieces 8 and 9. This plastic plate eliminates possible frictional difficulties which might possibly occur as the paper passes over the pole pieces and which would result in tearing or marking of the paper. Plate 17 can be fabricated from a plastic such as Teflon or Kel-F. It is also to be noted that magnet 5 can be an electromagnet in lieu of a permanent magnet.

During the conditioning period before measurement, which occurs as the paper web 10 passes through the magnetic conditioning region shown in Fig. 1, it is not essential that the magnetic field be exceedingly uniform. The primary requirement is that the magnetic field have a value close to the value of the field used in making the required measurement. As a consequence, great care need be used only in smoothing out the field variations in the measurement region.

A preferred moisture readout circuit for use in association with the magnet assembly of Fig. 1 is shown in Fig. 4. In this circuit arrangement, the output terminals of radio-frequency coil 15 are connected to associated circuitry so that measurements can be made directly therefrom.

Capacitor 18 directly shunts coil 15 and this combination of components comprises a parallel-resonant tank circuit. This tank circuit is energized by radio-frequency oscillator 19 having a constant-current output. This signal output is frequency modulated by a modulation source 20 so that the tank circuit 15—18 is periodically energized at the nuclear magnetic resonance frequency for the quantity to be measured and for the magnetic field strength used. In moisture content measurements, the resonant frequency is that of the hydrogen nucleus.

The output of modulation source 20 is also applied to oscilloscope 21 so that the horizontal sweep potential is synchronized with the frequency modulation signal applied to oscillator 19.

For optimum signal output, the parallel resonant tank 15—18 is tuned to the nuclear magnetic resonance frequency. As the modulated output of the oscillator energizes the tank circuit, proton absorption of hydrogen nuclei in the moisture of the paper lowers the Q of the tank circuit in such a manner that the parallel impedance of the tank varies in correspondence with changes in the moisture content. This impedance variation produces an amplitude modulation of the frequency modulated signal applied to the input of the radio-frequency amplifier 22. The amplitude modulated component is thereafter detected in the detector and audio-amplifier unit 23 and is applied to the vertical sweep amplifier of the oscilloscope 21.

In view of the fact that the horizontal sweep frequency is determined by the modulation frequency, the amplitude modulation produced by moisture variations in the paper under test produces a fixed pulse of correspondingly varying amplitude on the screen of the oscilloscope.

It is to be understood that the above described arrangements are illustrative of the application of the principles of this invention. Numerous other arrangements may be devised by those skilled in the art without departing from the scope of the invention.

What is claimed is:

1. In apparatus for making nuclear magnetic resonance measurements on thin sheet material during the movement thereof, the improvement comprising a pair of thin and relatively long pole pieces disposed in the same plane and having adjacent ends spaced to form a relatively narrow gap having a width corresponding to the length of said pole pieces, means magnetically saturating the ends of said pole pieces to establish a uniform magnetic field across said gap, means for moving the sheet material under test in a plane parallel to the plane containing the pole pieces and in a direction parallel to the ends of said pole pieces whereby a section of the sheet adjacent the gap is subjected to a magnetic field parallel to the plane of the sheet, a radio-frequency coil disposed adjacent the portion of the sheet subjected to said magnetic field with the longitudinal axis of said coil being perpendicular to the plane containing the pole pieces, capacitive reactance means connected to said coil to form a resonant circuit at the nuclear magnetic resonance frequency for the particular nucleus being measured, and a frequency-modulated, constant-current, radio-frequency source energizing the resonant circuit periodically at the nuclear magnetic resonance frequency whereby the voltage across said circuit is amplitude modulated in accordance with variations of the nuclear absorption of the sheet material.

2. In apparatus for making nuclear magnetic resonance measurements on thin sheet material during the movement thereof, the improvement comprising a pair of thin and relatively long pole pieces disposed in the same plane and having adjacent ends spaced to form a relatively narrow gap having a width corresponding to the length of said pole pieces, means magnetically saturating the ends of said pole pieces to establish a uniform magnetic field across said gap, means for moving the sheet material under test in a plane parallel to the plane containing the pole pieces and in a direction parallel to the ends of said pole pieces whereby a section of the sheet adjacent the gap is subjected to a magnetic field parallel to the plane of the sheet, a radio-frequency coil disposed adjacent the ends of said pole pieces to energize a localized portion of the sheet which spans said gap with a radio-frequency field perpendicular to the magnetic field through the energized portion of the sheet, and means translating the impedance variations of said coil in response to nuclear absorption to a correspondingly varying output signal.

3. In apparatus for making nuclear magnetic resonance measurements on thin sheet material during the movement thereof, the improvement comprising a pair of thin and relatively long pole pieces disposed in the same plane and having adjacent tapered ends spaced to form a relatively narrow gap having a uniform width corresponding to the length of said pole pieces, means magnetically saturating the ends of said pole pieces to establish a uniform magnetic field across said gap, means for moving the sheet material under test in a plane parallel to the plane containing the pole pieces and in a direction parallel to the ends of said pole pieces whereby a section of the sheet adjacent the gap is subjected to a magnetic field parallel to the plane of the sheet, and relatively thin non-magnetic means disposed between said pole pieces and said sheet to prevent friction contact therebetween.

4. In apparatus for making nuclear magnetic resonance measurements on thin sheet material during the movement thereof, the improvement comprising a pair of thin and relatively long pole pieces disposed in the same plane and having adjacent ends spaced to form a relatively narrow gap having a width corresponding to the length of said pole pieces, means magnetizing the ends of said pole pieces to form a uniform magnetic field across said gap, and means for moving the sheet material under test in a plane parallel to the plane containing the pole pieces and in a direction parallel to the ends of said pole pieces whereby a section of the sheet adjacent the gap is subjected to a magnetic field parallel to the plane of the sheet, said pole pieces being sufficiently long to subject the portion of the sheet material adjacent the gap to a magnetic field for at least the relaxation time for the nucleus under measurement.

5. In apparatus for making nuclear magnetic resonance measurements on thin sheet material during the movement thereof, the improvement comprising a pair of thin and relatively long pole pieces disposed in the same plane and having adjacent ends spaced to form a relatively narrow gap having a width corresponding to the length of said pole pieces, means magnetically saturating the ends of said pole pieces to establish a uniform magnetic field across said gap, and means for moving the sheet material under test in a plane parallel to the plane containing the pole pieces and in a direction parallel to the ends of said pole pieces whereby a section of the sheet adjacent the gap is subjected to a magnetic field parallel to the plane of the sheet.

6. In apparatus for making nuclear magnetic resonance measurements, an improved magnet assembly comprising a magnet having a pair of thin and relatively wide magnet legs and a pair of thin and relatively long, blade-like pole pieces each capping a different one of said legs to form a relatively narrow gap between adjacent ends of said pole pieces having a gap width corresponding to the length of said pole pieces and the width of said magnet legs, and a radio-frequency coil disposed between the legs of said magnet with the longitudinal axis of said coil being perpendicular to the direction of the magnetic field across the gap.

References Cited in the file of this patent

UNITED STATES PATENTS

| | | |
|---|---|---|
| 2,263,485 | Clopton | Nov. 18, 1941 |
| 2,721,970 | Levinthal | Oct. 25, 1955 |
| 2,799,823 | Shaw et al. | July 16, 1957 |

OTHER REFERENCES

Suryan: Physical Review, vol. 80, 1950. Page 119 relied on.